July 7, 1964 J. SANGEORGE 3,139,880
PORTABLE GRILL
Filed Oct. 10, 1962 2 Sheets-Sheet 1
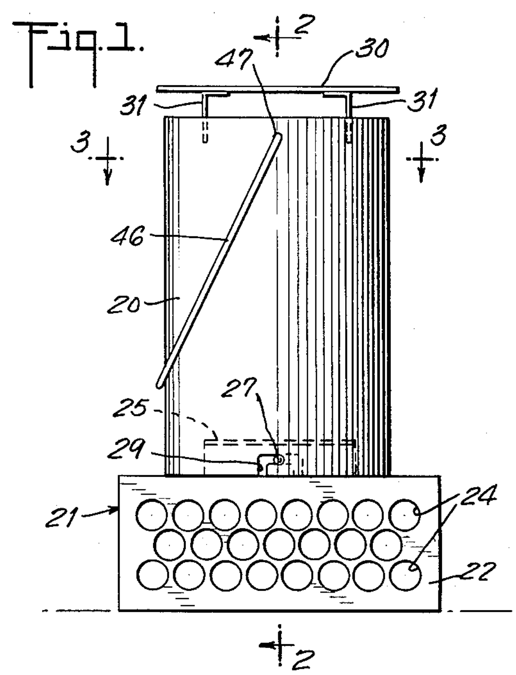
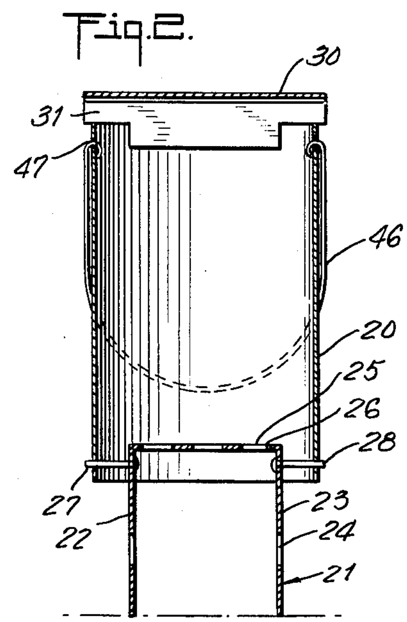
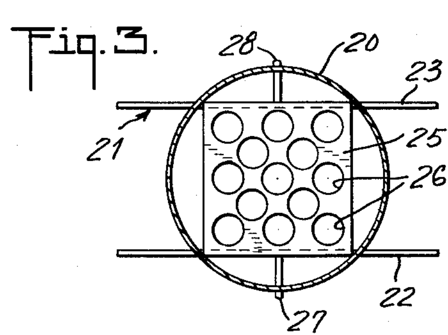
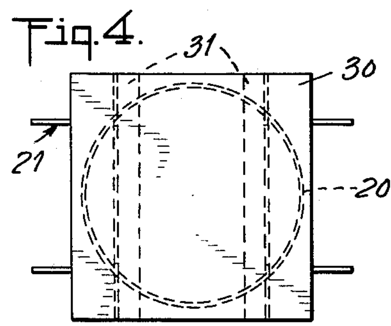
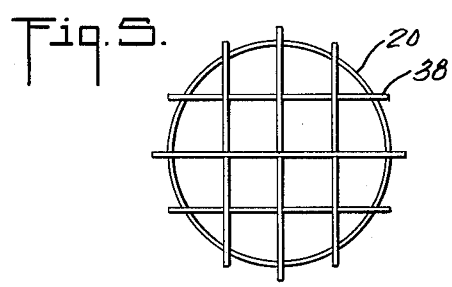
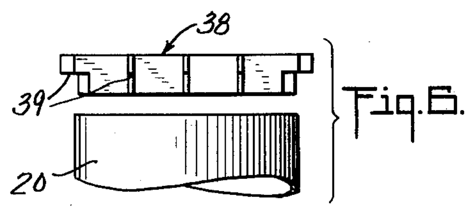
INVENTOR
JOSEPH SANGEORGE
BY Luther W. Hawley
ATTORNEY July 7, 1964 J. SANGEORGE 3,139,880
PORTABLE GRILL
Filed Oct. 10, 1962 2 Sheets-Sheet 2
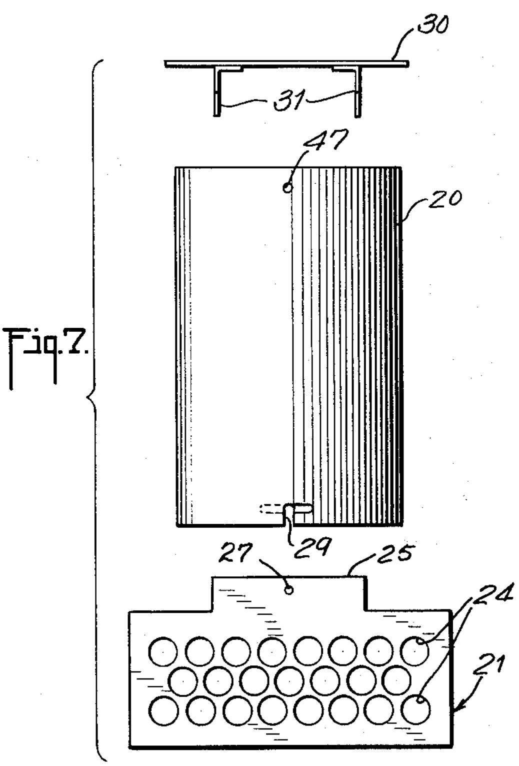
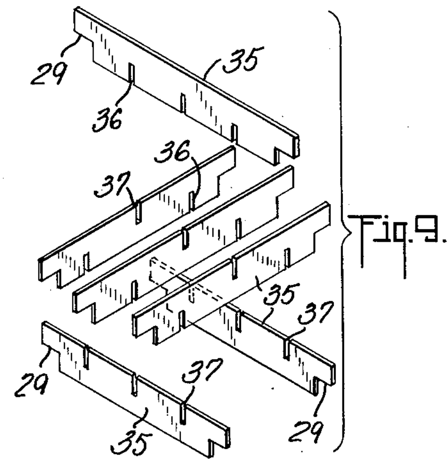
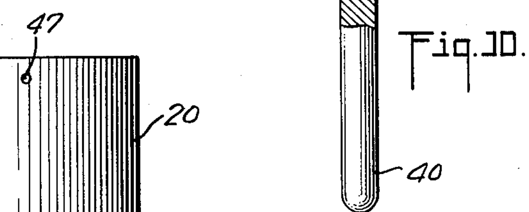
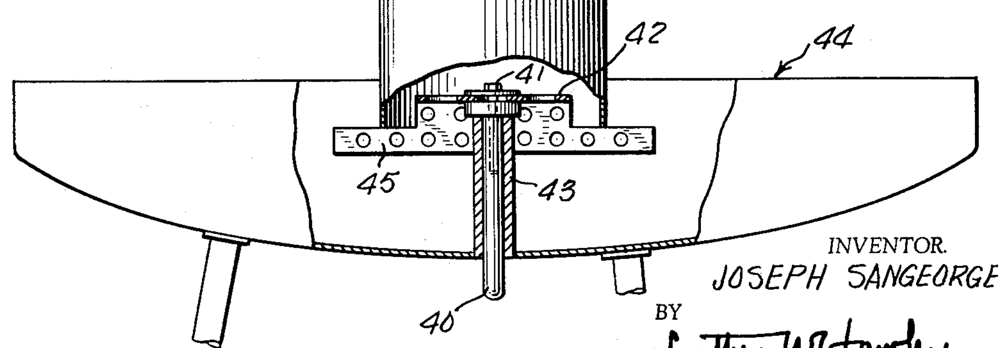
INVENTOR.
JOSEPH SANGEORGE
BY
Luther W. Hawley
ATTORNEY

United States Patent Office 3,139,880
Patented July 7, 1964

3,139,880
PORTABLE GRILL
Joseph Sangeorge, 304 Standish Ave., Hackensack, N.J.
Filed Oct. 10, 1962, Ser. No. 229,634
5 Claims. (Cl. 126—25)

This invention relates to a portable grill and grill support.

Portable grills for use out of doors are now common and are often bulky and expensive. This invention has for its salient object to provide a simple, practical, compact and inexpensive grill and grill support.

Another object of the invention is to provide a grill of the character described in which the parts are cheap and can be easily assembled and taken apart after use and while still hot.

Another object of the invention is to provide a chimney or pipe support and means for connecting the chimney and support so that the chimney will not be accidentally knocked off.

Another object of the invention is to provide a chimney with a support so constructed as to admit air to the chimney supported thereby.

Another object of the invention is to provide a portable charcoal burning grill with a combination hot plate and damper.

Further details of the invention will appear from the following specification taken in connection with the drawings which form a part of this application, and in which:

FIG. 1 is an elevational view of a chimney and support in assembled relation;

FIG. 2 is a vertical sectional elevation of the structure shown in FIG. 1 taken substantially on line 2—2, looking in the direction of the arrows;

FIG. 3 is a transverse elevation taken substantially on line 3—3 of FIG. 1, looking in the direction of the arrows;

FIG. 4 is a top plan view of the structure shown in FIG. 1;

FIG. 5 is a plan view of a grill adapted to rest on top of the chimney;

FIG. 6 is an elevational view showing a portion of the chimney and the grill in position to be assembled;

FIG. 7 is a view similar to FIG. 1 with the parts in separated position before assembling;

FIG. 8 is an elevational view, partly in section, showing an alternative form of support for the grill;

FIG. 9 illustrates the strips used to form the grill in disassembled relation; and FIG. 10 is an elevational view, partly in section, showing the grill support shown in FIG. 8.

In the particular embodiment of the invention illustrated in the drawings, there is shown a chimney 20 which consists of a cylinder or pipe and a base or support 21 on which the chimney is mounted. The support 21, in the particular form of the invention shown, has parallel side walls 22 and 23 which are perforated, as shown at 24, and a top 25 which connects the side walls together and is perforated, as shown at 26. The upwardly extending portions of walls 22 and 23 (see FIGS. 1–3) respectively have outwardly extending pins 27 and 28 which are adapted to extend into bayonet slots 29 formed in the bottom of the chimney wall. When the support and chimney are assembled, the pins 27 and 28 are inserted in the vertical portions o fthe bayonet slots and the chimney is then turned to position the pins in the horizontal portions of the slots.

The walls 22 and 23 can be supported on the ground, or, if desired, can be supported in the bowl of an outdoor grill, and the draft for the chimney enters through the walls 22 and 23 and through the space between the walls and the fire in the chimney is built above the top 25 of the support.

In FIGS. 1 and 2 a hot plate 30 is supported on the top of the chimney and consists of a flat plate having vertical strips or legs 31 extending downwardly therefrom.

In FIGS. 5, 6 and 9 there is illustrated a grill consisting of flat strips 35 having vertical slots 36 extending upwardly therein and slots 37 extending downwardly. These strips are assembled to form the grill 38 and the grill is inserted in the top of the chimney and rests on the extensions or ledges 39 of the grill.

In FIG. 8 there is shown a modified mounting of the grill, in which a pin or post 40 is secured by a bolt 41 to the top 42 of the support. The post 40 is adapted to extend downwardly into a tube 43 secured centrally in the bowl 44 of an outdoor grill. The chimney support, consisting of walls 45, supports the chimney in the same manner as the support shown in FIGS. 1 to 7 inclusive.

The chimney 20 has a pair of holes 47 through which are inserted the hooked ends of a bail 46. If desired, instead of a bail the chimney can be removed by inserting a rod or poker through the holes 47.

In use, the chimney is assembled on the support, and paper is placed in the chimney on top of the support and charcoal is placed on the paper and the fire is ignited. It it easy to ignite the fire, even with a strong wind.

After the charcoal is burned, the fire can be dampened by inverting the hot plate 30.

Although one specific embodiment of the invention has been particularly shown and described, it will be understood that the invention is capable of modification and that changes in the arrangement and in the construction of the various cooperating parts may be made without departing from the spirit or scope of the invention, as expressed in the following claims.

What I claim is:

1. A portable grill comprising a support having spaced perforated side walls and a transverse perforated top for permitting the ready passage of combustion air and an elongated tubular chimney having open upper and lower ends for containing charcoal or the like, each of said side walls including an upper portion extending transversely of said chimney and into the lower end of said chimney for retaining fuel in said chimney, means connecting the lower end of said chimney for removable engagement with the upper portions of said side walls and said chimney having a cross-sectional area greater than the transverse perforated top, to provide a substantially clear and uninterrupted draft passage outwardly of said transverse perforated top around the entire under surface and length of said chimney, said side walls being integral with said upper portion extending into the lower end of said chimney and integral with said transverse perforated top, said side walls having free upper edges flanking said transverse perforated top and engaging lower edge portions of said chimney.

2. The structure of claim 1 in which said transverse perforated top includes a grill mounting pin depending from an intermediate portion thereof and a grill bowl having a tubular sleeve to receive said pin.

3. The structure of claim 2 including separable connecting means between the lower end of said chimney and said support side walls, said connecting means comprising cooperating portions on the lower end of said chimney and the portion of said support disposed within the lower end of said chimney.

4. The structure of claim 3 in which said cooperating portions include at least one pin mounted on and extending laterally from one side wall of said support and a bayonet slot opening into the lower edge of said chimney.

5. The structure of claim 2 wherein the tubular sleeve is open at both ends and extends vertically in the bowl, said grill mounting pin being rotatably and vertically adjustably received in said bowl tubular sleeve.

References Cited in the file of this patent

UNITED STATES PATENTS

| | | |
|---|---|---|
| 550,157 | Burns | Nov. 19, 1895 |
| 1,934,339 | Winberg | Nov. 7, 1933 |
| 2,943,557 | Suehlsen | July 5, 1960 |
| 3,062,200 | Miller | Nov. 6, 1962 |
| 3,073,263 | Wynkoop | Jan. 15, 1963 |